US011182775B2

(12) United States Patent
Makowski (10) Patent No.: US 11,182,775 B2
(45) Date of Patent: Nov. 23, 2021

(54) ASSET-BACKED ELECTRONIC CURRENCY SYSTEMS AND METHODS

(71) Applicant: Gary G. Makowski, Huntsville, AL (US)

(72) Inventor: Gary G. Makowski, Huntsville, AL (US)

( * ) Notice: Subject to any disclaimer, the term of this patent is extended or adjusted under 35 U.S.C. 154(b) by 250 days.

(21) Appl. No.: 16/387,371

(22) Filed: Apr. 17, 2019

(65) Prior Publication Data

US 2020/0334669 A1    Oct. 22, 2020

(51) Int. Cl.
| | |
|---|---|
| *G06Q 20/36* | (2012.01) |
| *G06Q 20/06* | (2012.01) |
| *G06Q 20/14* | (2012.01) |
| *G06Q 20/38* | (2012.01) |

(52) U.S. Cl.
CPC ..... *G06Q 20/3678* (2013.01); *G06Q 20/0658* (2013.01); *G06Q 20/14* (2013.01); *G06Q 20/389* (2013.01); *G06Q 2220/00* (2013.01)

(58) Field of Classification Search
USPC .......................................................... 705/50
See application file for complete search history.

(56) References Cited

U.S. PATENT DOCUMENTS

| | | | |
|---|---|---|---|
| 10,140,658 B1* | 11/2018 | Bagherzadeh | G06Q 40/04 |
| 10,439,812 B2* | 10/2019 | Patin | H04L 9/0894 |
| 2007/0027787 A1* | 2/2007 | Tripp | G06Q 40/06 705/36 R |
| 2019/0122297 A1* | 4/2019 | Goto | G06Q 40/04 |
| 2019/0245688 A1* | 8/2019 | Patin | H04L 9/0637 |
| 2020/0036523 A1* | 1/2020 | Patin | H04L 9/0866 |
| 2021/0042826 A1* | 2/2021 | Pete | H04L 9/3073 |

* cited by examiner

*Primary Examiner* — James D Nigh
(74) *Attorney, Agent, or Firm* — Dennen IP Law, LLC (57) ABSTRACT

A cryptocurrency system of the present disclosure employs one or more creator computing devices, one or more initial transaction computing devices, one or more asset-backed computing devices, one or more certifier computing devices, and one or more block chain verifier computing devices. In operation, the system enables a person or legal entity to create and manage electronic currency that is backed by assets.

27 Claims, 8 Drawing Sheets

ASSET-BACKED ELECTRONIC CURRENCY SYSTEMS AND METHODS

BACKGROUND

Cryptocurrency is being used more and more and transactions between entities tend to be electronic. It is essentially a digital currency that employs encryption to regulate the generation of the cryptocurrency and verify the transfer of funds. In a block-chain based cryptocurrency all transactions that are verified are attached to a public ledger called a block chain, which memorializes all transactions that occur through cryptocurrency. Cryptocurrency is not government issued money. Instead, it is created and held electronically.

Users of cryptocurrency can perform transactions using their cryptocurrency. In this regard, one could buy goods or services on the Internet. The transactions of sales where there is a decrease or an increase in an owner's cryptocurrency are kept in the block chain.

Bitcoin is the oldest and most used cryptocurrency. In order to participate in bitcoin transactions, a user purchases a pot of bitcoins with government issued money, or they may receive bitcoins for maintaining the bitcoin block chain. The user can then use the bitcoins on the Internet.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure describes asset-backed electronic currency systems and methods. In an embodiment, logic creates electronic coins upon request by a legal person (the "creator"). The system levies creation fees against the creator for supporting the system operation and maintenance. Each coin created is available to be backed by an asset, e.g., real property (the equity remaining after any remaining mortgage amount), put forth by the creator. Note, however, coins can be created that are not given asset backing. Also, the system creates links for and maintains a block list that comprises all electronic currency transactions.

Figure 1:
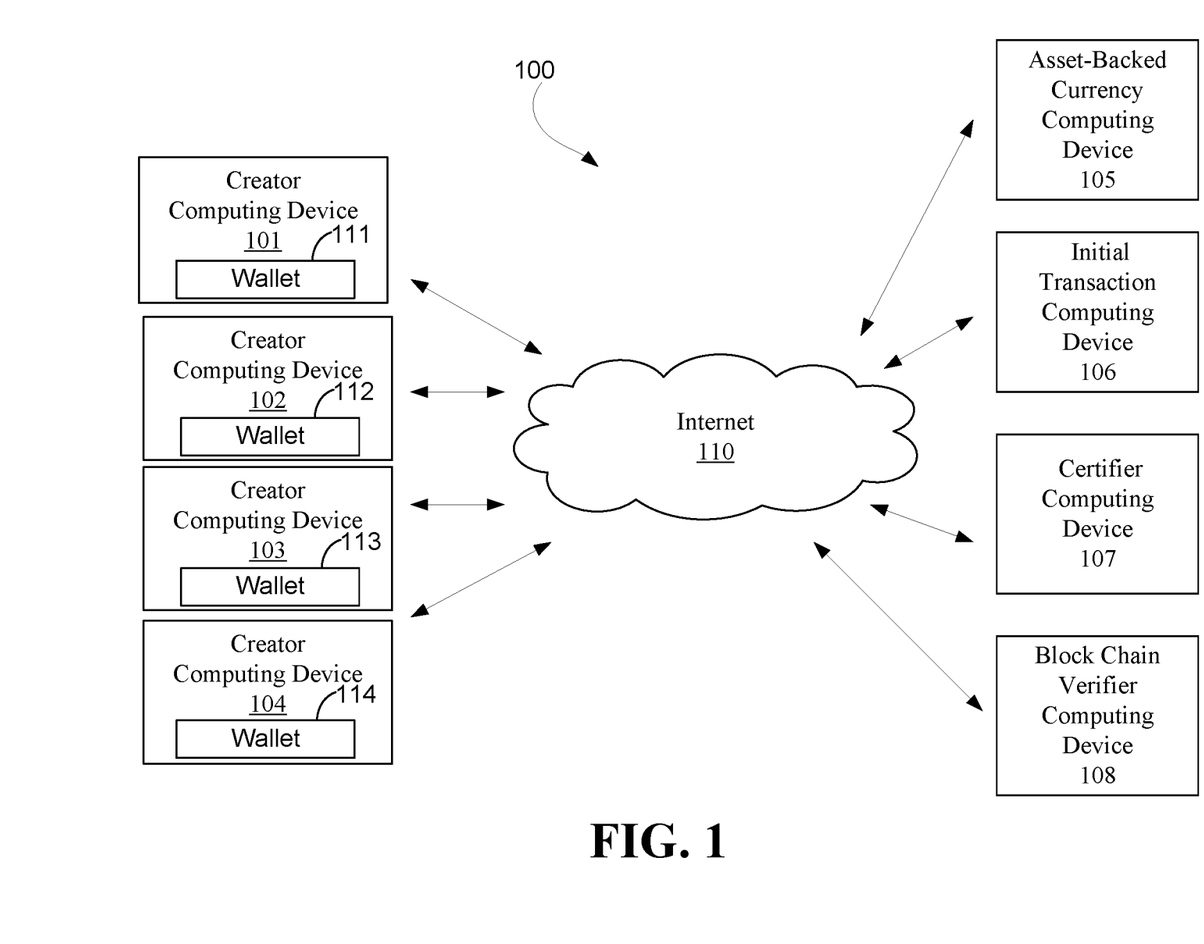
FIG. 1 is a block diagram depicting an asset-backed electronic currency system in accordance with an embodiment of the present disclosure.

FIG. 1 is a block diagram depicting an asset-backed electronic currency system 100. The system 100 comprises a plurality of creator computer devices 101-104. Note that four creator computer devices are shown; however more or fewer creator computing devices are anticipated in other embodiments of the present disclosure. The creator computing devices 101-104 communicate with an asset backed currency computing device 105, an initial transaction computing device 106, a certifier computing device 107, and a block chain verifier computing device 108 via the Internet 110. Note that the Internet 110 may be any type of network known in the art or future-developed.

Each creator computing device 101-104 has a corresponding electronic wallet 111-114. An electronic wallet is data stored in memory and includes a processor and logic reserved for tracking coins as the coins go through transactions. In this regard, the creator computing device 101 may initially back 100 coins (backing is described further herein). As the creator computing device 101 receives or gives away coins within the wallets 111-114, the amount of coins is incremented or decremented accordingly. The creator computing devices 101-104 and their corresponding wallets 111-114 are used by all coin owners. A coin owner may have created the coins or may have acquired them.

As described, the system 100 further comprises the asset-backed currency computing device 105, the initial transaction computing device 106, the certifier computing device 107, and the block chain verifier computing device 108. Devices 105-108 are communicatively coupled to the creator computer devices 101-104 via a network 110, e.g., the Internet. Note that the network shown is the Internet 110; however, other networks or types of networks may be used in other embodiments of the present disclosure. Further, while only one block chain verifier computing device 108 is shown, there may be more than just one block chain verifier computing device in other embodiments.

The asset-backed currency computing device 105 provides software to create asset-backed electronic currency in the form of electronic coins, to perform transactions using the coins, and to back the coins requested with assets.

The initial transaction computing device 106 oversees the creation of coins. In this regard, the initial transaction computing device 106 collects fees for creating the coins (a "creation fee").

The certifier is an organization that employs a certifier computing device 107 to handle the backing of coins (coin certification). Further, the certifier employs a certifier computing device 107 to handle the removal of the backing (coin decertification). The certifier, employing the certifier computing device 107, levies fees for certification and fees for de-certification.

Once fees have been collected by the initial transaction computing device 106, and the coin creator desires that the coins be certified, the certifier, employing the certifier computing device 107, contractually constrains the assets identified by the initial transaction computing device 106. In one embodiment, the certifier, employing the certifier computing device 107, requires a signed contract from a coin creator. That signed contract specifies penalties that the coin creator agrees to pay to the certifier if the coin creator disposes assets that the coin creator has pledged as coin backing or fails to maintain clear title to the asset with no liens, mortgages or other encumbrances.

In exchange for certification of the asset, the certifier, employing the certifier computing device 107, levies a one-time fee (the "certification fee") against the creator. In operation, the certifier computing device 107 assigns a certification identifier to each coin created, which can be a string of numbers or alphanumeric characters. Note that the contract that pledges assets as coin backing can be terminated provided that the asset owners pay a termination fee to the certifier, employing the certifier computing device 107. Also note, in one embodiment, the certification identifier is included in each and every transaction involving the coin to which it is given.

The fundamental documents that are the basis for certification may be paper documents that may be notarized, or they may be electronic digitally signed documents. Paper documents are preferable. Secondary documents that support the fundamental documents may include titles, assessed value documents, and various accounting documents. Further, the fundamental documents may be smart contracts, smart bonds, and smart titles that may be used for certification.

Note that the assets designated as coin backing by a creator are not collateral. No one is loaning anything to the creator or to the certifier. The creator is simply creating and issuing coins by the creator's own actions. Therefore, the assets designated as coin backing are not collateral for a loan.

Note that the system 100 shows the devices 105-108 as separate and distinct devices. However, in other embodiments functionality of a portion or all of the devices 105-108 may be included on a single computing device. In this regard, FIG. 1 depicts the functionality of the devices decentralized for ease of discussion. Notably, however, in one embodiment there may be multiple block chain verifier computing devices 108 competing for transaction fees. These devices may not constitute a single computing device.

After creation of the coins by the creator, the asset-backed currency computing device 105 broadcasts or makes available or transfers data indicative of a creation fee and the number of coins created to the initial transaction computing device 106 and to one or more block chain verifier computing devices 108. That fee is used to support block chain processing, and processing performed by other computing devices.

Upon creation of electronic coins by the creator, the initial transaction computing device 106 computes a creation fee. The initial transaction computing device 106 levies the creation fee against the creator for each coin created. The creator can pay the creation fee online through a credit card, debit card, or PayPal®.

Additionally, the asset-backed currency computing device 105 broadcasts or makes available data indicative of creation of coins or a transaction involving electronic coins to one or more block chain verifier computing devices 108. A block chain verifier computing device 108 creates an electronic block, verifies the data in the block, and creates an entry for the creation or transaction in a block list. In one embodiment, this block list is public. In this regard, a block of the present disclosure may comprise the following:
 (1) Zero or more coin creation transactions;
 (2) Zero or more spending transactions;
 (3) Computational proof of work; (Same order as FIG. 2)
 (4) Zero or more certification identifiers & supporting information.
 (5) Zero or more decertification identifiers & supporting info.
 (6) Reference to the chronologically prior block.

Proof of work for a given block in the block chain is the computationally involved hash of the previous block in the block chain. The first hash calculation that meets the current protocol for number of zero bits in the computed hash value will be the hash value inserted into the next block added to the block chain. The entity that made that first acceptable calculation will garner rewards for this accomplishment. An example of a block-chain hash in hexadecimal format is the following: 00000000000000001e8d6829a8a21adc5d38d0a 473b144b6765798e61f98bd1d.

Figure 2:
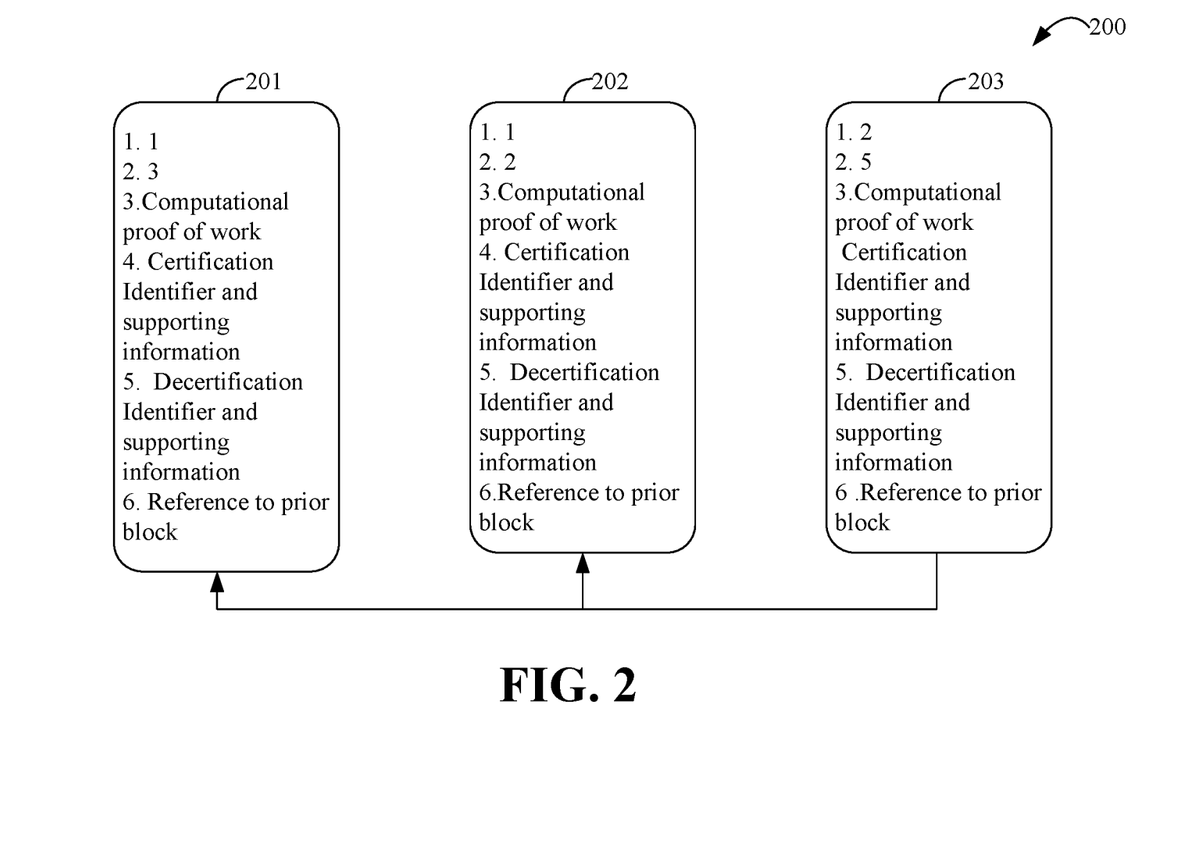
FIG. 2 is an exemplary block chain used by the system depicted in FIG. 1.

Note that successive additions of blocks representing coin creation and transactions results in a linked chain of block transactions, as shown in FIG. 2. The block chain may contain every creation and/or transaction dealing with the electronic coin created by the creator. In order for an electronic coin to be used in transactions, it must be represented in a block in the block chain. In one embodiment, a single blockchain verifier may be used to maintain an electronic coin block chain. In another embodiment, multiple independent blockchain verifiers maintain tentative block chains. The accepted block chain is determined by public consensus (as it is for bitcoin). It is usually the longest among those tentative block chains. A blockchain verifier corresponds to a Bit Coin "miner".

In one embodiment, the block chain verifier computing device 108 that successfully satisfies the "proof of work" requirement and adds the block to the block chain levies a transaction fee against the creation fee. The transaction fee is to fund the subsystem (community of successful block chain verifiers satisfying "proof of work" requirements) that maintains the block chain.

In one embodiment, most of the creation fee is used to support the integrity of the block chain. In this regard, as discussed, the creation fee is levied against the creator by the initial transaction computing device 106. Most of this fee is awarded to the block creator-verifier who ultimately validates the related transaction by incorporating the representative block into the block chain.

With reference to FIG. 2, an exemplary block chain 200 is illustrated. The most recent block 203 comprises data indicative of two coin creation transactions, five spending transactions, computational proof of work (described further herein), a certification identifier and supporting information, a decertification identifier and supporting information, and a pointer or reference to the prior block 202. Each block 201-203 comprises the same data types. Note that the block chain 200 is a publicly available data. Note that the owner or owners of the coins represented by the blocks 201-203 are not indicated in the block data.

Note that a certification identifier is a unique index assigned by the certifier computing device 107 to a record in a data array, database and/or block-chain block, that contains or references all information pertaining to a decision made by the certifier to accept certain pledged assets as backing for a number of coin(s). That number is determined by the certifier computing device 107. The signed legal documents that constrain the pledged asset(s) are referenced in that data record. The information used to determine the number of coins that can be backed by the pledged assets, and identifying numbers for those assets, are included or referenced as well in the data record that corresponds to the unique index assigned by the certifier to this certification decision. Information pertaining to the "certification fee" paid to the certifier by the coin owners would be included in that data record as well. The unique index described above is called the "Certification Identifier".)

Further note that a de-certification identifier is a unique index assigned by the certifier to a record in a data array, database and/or block-chain block, that contains or references all information pertaining to a decision made by the certifier to de-certify coins. That record would include details concerning the "decertification fee" paid to the certifier by coin owner(s).

Furthermore, creators (or coin owner(s)) may perform transactions related to their coins. For example, perform a buy or a swap. A block chain verifier computing device 108 verifies the transaction and adds information related to the transaction in a block in the block chain. Associated with the transaction, the creator (or coin owner(s)) is levied a transaction fee, which is used to reward the block chain verifier (computing device) that successfully satisfied the "proof of work" and added the block to the block chain.

Referring back to FIG. 1, once the request for electronic currency by the creator is complete, the initial transaction computing device 106 creates the electronic coins. In one embodiment the asset-backed currency computing device 105 transmits data to the certifier computing device 107 indicating the asset that is to be used by the certifier computing device 107 to certify the asset. In another embodiment, the initial transaction computing device refers the creator to the certifier, so the creator can deal directly with the certifier. The certifier computing device 107 facilitates, manages, and records the backing of the coins. Note that coins can be created without asset backing or certification. All that is required for coin creation is the payment of the appropriate creation fee.

In return for certifying a given amount of coins, the certifier, employing the certifier computing device 107, facilitates in contractually constraining the assets indicated. Note that to certify particular assets, the certifier computing device 107 may request a certification fee. In one embodiment, the certification fee may be some small percentage of the contractually reserved assets.

In one embodiment, the certifier, employing the certifier computing device 107, facilitates decertification by the owner(s) of the coins. In exchange for decertification, the coins are cashed out. The certifier computing device electronically disperses to the coin owners the cash value of the coins decertified minus a decertification fee levied by the certifier computing device 107.

Note that as discussed herein a unique string is associated with the coins created. When decertification occurs, the string continues to identify the coins regardless of decertification.

As discussed herein, the certifier computing device 107 performs the certification of the backing to support coins created by the creator using software provided by the asset-backed currency computing device 105. In performing certification, the certifier computing device 107 follows particular equations. For purposes of clarity, the amount of coins that the certifier computing device 107 certifies is called the "certified backing." Certified backing is measured in coins and is determined by the following algorithm:

$$\text{Certified Backing} = ALCV \times C_{PL} \times C_{FRAC} \times C_{LCR} \times AVF$$

where ALCV is the asset local currency value, $C\_PL$ is the pledged fraction, $C\_FRAC$ is the coin fraction, $C\_LCR$ is the coin local currency ratio, and AVF is the asset volatility factor.

The ALCV value is an estimated value of the asset in some local (government-issued currency), e.g., the U.S. dollar. The certifier, with input from the user, determines the ACLV, and inputs that ACLV into the certifier computing device 107. The C_PL value is the fraction of the ALCV that is pledged by the user for coin backing. The pledged value, in the currency specified by the ALCV, is the product of ALCV and C_PL.

The C_FRAC value is a fraction of the pledged value that is acceptable to the user and the certifier to use as coin backing. In one embodiment, this value is between 0.3 and 1.0. This value reflects the value of the asset being used as backing. For example, setting this fraction to 0.5 means that there is far more asset value backing coins than the coins are valued. Note that the range 0.3-1.0 is merely exemplary, and other values may be used in other embodiments of the present disclosure.

C_LCR is a ratio, which is the fractional number of certified coins that correspond to one unit of the local currency. For example, in the United States, the C_LCR is the fractional number of certified coins that correspond to one U.S. dollar. For each local currency, the C_LCR is set by the certifier. This number will fluctuate just as currencies often fluctuate in value. The C_LCR may be periodically adjusted by the certifier computing device 107 to account for such currency fluctuations, or other fluctuations.

AVF is a fractional multiplier used by the certifier to decrease the amount of coin it will certify because of past volatility for asset of the type being used for backing. The AVF number is always positive and less than or equal to one.

In one embodiment, the certifier computing device 107 pools all assets that are contractually pledged to support coin certification. These are the coin backing assets (C_BA), and the pool is the coin backing asset pool (C_BAP). The certifier, employing the certifier computing device 107, determines whether an asset qualifies as a C_BA by determining whether the asset owner agrees contractually to hold free and clear title to the asset, with no liens, mortgages or other encumbrances, and the owner agrees to pay coin decertification maintenance fees in the unlikely event that some coins are decertified.

It is important to note here that certified coins are backed by the pool, not by the specific assets contractually pledged by the creator to support certification of the coins.

As indicated hereinabove, the certified coin owner may desire to decertify and obtain cash value for the coins owned. In this regard, the certified coin owner logs onto the certifier computing device 107, and provides input indicating that the certified coin owner desires to decertify all or a portion of his/her coins.

In response, the certifier computing device 107 provides a graphical user interface (GUI) to the creator computer device 101 that displays CDV_USD, the coin decertification value in USD. That value is set by the certifier. Its default value is 1/C_LCR, expressed in USD (per coin). The GUI may comprise a variety of ways in which the user can receive monetary value for his/her decertified coins. For example, the certifier computing device 107 may deposit a dollar equivalent in a checking account indicated by the creator computer device 101 minus a decertification fee.

Note that the decertification fee is a small percentage of the current value of the coins being decertified. The decertification fee assessment is made to encourage coin owners to sell the coins through independent transfer. Additionally, decertification reduces the number of coins backed by assets whereas independent exchange results in all coins that had asset backing are still backed by assets.

When coins are cashed out, the certifier computing device 107 transmits a message to all creator computer devices 101-104 requesting an offset value to recoup the value transferred by the certifier to the owner of the coins being decertified. This fee is indicated as a coin decertification maintenance fee.

In this regard, a decertification maintenance fee is levied on creators (or other holders of backing assets) of certified coins to compensate the certifier for decertified coins. To accurately account for the value of decertified coins, the certifier computing device 107 removes the value of the decertified coins from the backing asset obligations of all creators (or other backing asset holders) with active pledge agreements.

As noted hereinabove, a creator enters into a contract with the certifier, the entity that controls the certifier computing device. In the contract, the creator pledges assets owned by the creator as backing for some amount of coins. At the time of creation of the coins under contract, the present amount of the coins that are certified is set to the value of the certified backing (CB). For example, if the creator pledges a piece of property valued at $12,000 and the certifier calculates a certified backing of $10,000 based on that property, then the certifier will certify an amount coins corresponding to $10,000 (USD). Thus, a coin backing asset contract instance is the event where a creator pledges assets owned by the creator as backing for some amount of coin (C_BA_CI), and a coin backing asset contract instance current amount is the current amount of coins for which the creator is obligated to provide backing (C_BA_CI_CA). At the time of certification, the coin backing asset contract instance current amount is set to the value of the coins being certified. The TOTAL Coin Backing Asset Contract Instance Current Amount (TOTAL_C_BA_CI_CA) is defied to be sum of all the Coin Backing Asset Contract Instance Current Amounts (where that sum is taken over all: C_BA_CI's where the asset pledge agreement is still applicable.) This quantity is measured in Coins.

Suppose that each asset in the BAP (backing asset pool) corresponds to a single C_BA_CI and that each C_BA_CI corresponds to a single asset. Let M represent the total number of assets in the BAP (where the corresponding asset pledge is still in effect). For each asset k, let $C\_BA\_CI\_CA_k$ represent the C_BA_CI_CA corresponding to that asset. Then the TOTAL Coin Backing Asset Contract Instance Current Amount (TOTAL_C_BA_CI_CA) is calculated as follows:

$$TOTAL\_C\_BA\_CI\_CA = \Sigma_{k=1\ldots M} C\_BA\_CI\_CA_k$$

When a coin owner decertifies a coin, the coin creator's or backing asset holder's backing asset contract instance current amount is adjusted downward by a coin decertification maintenance fee paid to the certifier by the creator or backing asset holder based on the coin backing asset contract instance. In this regard, for a given coin backing asset contract instance (C_BA_CI), the current amount is adjusted downwards by a coin decertification maintenance fee paid to the certifier by the creator or backing asset holder on behalf of the given coin backing asset contract instance. The coin backing asset contract instance current amount (C_BA_CI_CA) is measured in coins. As the coin backing asset contract instance current amount is adjusted downwards, the portion of the pledged assets that are obligated to serve as coin backing is commensurately reduced.

Suppose that each asset in the BAP corresponds to a single C_BA_CI and that each C_BA_CI corresponds to a single asset. Let M represent the total number of assets in the BAP (where the corresponding asset pledge is still in effect). For each asset k, let $ALCV\_USD_k$ represent that asset's current value in USD. And let $PL\_FRAC_k$ represent the Pledged Fraction for that asset. Then BAP_USD, the value in USD, of the Coin Backing Asset Pool, is calculated as follows:

$$BAP\_USD = \Sigma_{k=1\ldots M} ALCV\_USD_k \cdot PL\_FRAC_k$$

The Current Value of the Coin Backing Asset Pool in USD, BAP_USD, will usually substantially exceed TOTAL_C_BA_CI_CA when that latter quantity is converted into USD. This reflects a conservative coin backing approach.

As noted, the certifier computing device 107 further determines the coin decertification maintenance fee. Note that the decertification maintenance fee is levied in a particular time interval, and the decertification maintenance fee is approximately equal to the value transferred by the certifier computing device 107 to the owners of certified coins being decertified in that time interval.

The total Coin Decertification Maintenance Fees levied in a given time interval approximately equals the value transferred by the certifier to the owners of Coins being decertified in that time interval. We rename that total fee as the "Total_Time_Interval_DMF". For a given time interval and for a given C_BA_CI, the Coin Decertification Maintenance Fee is calculated as follows:

$$\text{Coin Decertification Maintenance Fee} \equiv \underset{\text{(for given time interval)}}{Total\_Time\_Interval\_DMF} \times \underset{\text{(for given C\_BA\_CI)}}{C\_BA\_CI\_CA} \Big/ TOTAL\_C\_BA\_CI\_CA$$

In this regard the decertification maintenance fee is equal to the total time interval decertification maintenance fee multiplied by the coin backing asset contract instance current amount divided by the sum of all current amounts, TOTAL_C_BA_CI_CA. This fee is levied on each creator (or backing asset holder) who is still present in the coin pool.

When the C_BA_CI_CAs for all C_BA_CI_CAs associated with a given asset are zero, then that asset is removed from the C_BAP. Coin Backing Asset Pool Realignment is the removal from the C_BAP of one or more such assets.

In one embodiment, the certifier computing device 107 stores all data related to the coins backed by the asset pool. In one embodiment, this data is kept public. The data made available by the creator computing devices 101-104 may include coin identifiers, date of certification, coin owners name, a wallet address, and coin asset backing descriptive data. Note that each creator is allocated a wallet address, an address that identifies the creator's coin holding, i.e., the creator's wallet, at the time of coin creation.

In one embodiment, a creator can request electronically to approve the replacement of the coin backing assets by other assets owned by the creator. It is the certifier's decision (the certifier is the entity that provides and supports the certifier computing device 107) to approve such replacement. If the replacement is approved, the newly identified assets are subject to the same conditions as are assets pledged as backing for newly created coins. In one embodiment, information concerning the replacement backing assets would be made publicly available by the certifier computing device 107.

In one embodiment, the certifier may approve the replacement of the owners of the coin backing assets by other owners of assets. These other owners would provide coin backing assets and submit to the certification process described above for the coins.

In one embodiment, in the case where there is a deceased owner, a new owner or owners would replace the deceased owner. In one embodiment, the assets offered by the replacement owner(s) might be the same assets that were owned by the former coin backing asset holder. For example, those who inherit the estate may become the owners of the coins previously owned by the deceased.

Notably, the phrase coin backing assets holders (C_BAH) refers to the current owners of the assets pledged as coin backing. Upon the death of a coin backing asset holder, the estate of the coin backing asset holder is the replacement coin backing asset holder. The inheritors of the coin backing assets can request to be designated as the replacement as the coin backing asset holders for the coins backed by the assets.

If all the inheritors of the coin backing assets do not wish to serve as coin backing asset holders, the certifier computing device 107 levies a coin backing asset termination fee on the holders. For each coin backing asset contract instance the fee is the coin backing asset contract instance current amount. This amount is measured in coin, but can be expressed as an equivalent of U.S. dollars determined at the time of termination.

Note that the system 100 describes functionality spread across four computing devices 105-108. However, in another embodiment of the present disclosure the functionality ascribed to each of the computing devices 105-108 could reside on a single computing device.

Furthermore, in system 100 there is one asset-backed currency computing device 105, one initial transaction computing device 106, one certifier computing device 107, and one block chain verifier computing device 108. In other embodiments of the system 100 there may be more devices 105-108 that perform the described functionalities.

As an example, assume that there is certifier one and certifier two. Each of these certifiers have certifier computing devices similar to certifier computing device 107. In such an example, a coin denomination refers to the set of coins certified by a given certifier. A coin can be certified by at most one certifier. Thus, certifier one is allocated a very large set of certification identifiers. Assume certifier one is allocated identifiers CNS_1 (a number of integers for allocating to coins), and certifier two is allocated identifiers CNS_2. These sets of identifiers must be disjoint sets of identifiers.

In one exemplary embodiment, CNS_1 could be the set of all hexadecimal integers that begin with digit "1." CNS_1 could be the set of all hexadecimal integers that begin with digit "2." In another embodiment, CNS_1 could be the set of all alphanumeric strings of no more than 30 characters that begin with the string CNS_1, and CNS_2 could be the set of all alphanumeric strings of no more than 30 characters that being with the string CNS_2.

Note that these are merely exemplary. Certification numbers may vary in other embodiments. Notably, though, the sets of identifiers CNS_1 and CNS_2 must be disjoint sets.

As indicated hereinabove, some of the functionality of the devices 105-108 may be incorporated into a single device. However, for integrity, in one embodiment, the creation functionality and the certification functionality should be provided by different devices and entities.

Thus, the asset-backed currency computing device 105 and the initial transaction computing device 106 may be integrated into a single device that performs the functions of the devices of devices 105 and 106.

Likewise, there could be only one transaction device that incorporates the functionality of the initial transaction computing device 106 and the block chain verifier computing device 108.

Note however, there can be only a single certifier and certifier computing device 107 that deals with a given coin denomination. The certifier computing device 107 sets the denomination and backed value for the set of coins.

Further note that in one embodiment, separate legal entities own and operate the asset-backed currency computing device 105, the initial transaction computing device 106, the certifier computing device 107, and the block chain verifier computing device(s) 108. However, ownership and operation of the computing devices 105-107 may be consolidated. It is preferable that the certifier and the certifier computing device 107 be owned and operated by an entity separate and apart from the other devices.

In one embodiment of the present disclosure, the certifier computing device 107 uses a divisible serial number system to identify the coins created. In this regard, let EC represent one standard unit of e-currency or coin. In such example, suppose that the certifier computing device 107 is certifying 1000 units of EC. In such example, the identifying numbers must be a positive integers. Thus, in the example, the 1000 identifiers may be 8137, 8138, 8139, . . . , 9135, 9136.

Suppose that the owner of the ECs having the 1000 identifiers desires to pay 31% of 8742 to a first recipient, pay 67% of the EC to a second recipient and offer 2% of the EC as a transaction fee to the initial transaction computing device 106. Thus, the EC 8742 is partitioned into 100 fractional parts (FP) of equal value. The serial numbers of the fraction parts are then assigned by the initial transaction computing device 106 as 8742.00, 8742.01, 8742.02, . . . , 8742.98, and 8742.99.

Software provided by the asset-backed currency computing device 105 assigns the fraction parts to the recipients. In this regard, the fractional parts numbered 8742.00-8742.30 are assigned to the first recipient, the fractional parts numbered 8742.31-8742.97 are assigned to the second recipient, and the fractional parts number 8742.98 and 8742.99 are designated as the transaction fee.

Note that the fractional part with identifier 8742 is worth one standard unit of EC. The fractional part with serial number 8742.0 is worth on tenth of an EC, and the fractional part with identifier 8742.000 is worth one thousandth of an EC.

Thus, the number of digits to the right of the decimal point determines what fraction of an EC the fractional part is worth. If there is no decimal point, the fraction part is worth one EC. If there is one digit to the right of the decimal point, the fractional part is worth one tenth of an EC. If there are two digits to the right of the decimal point, the fractional part is worth one hundredth of an EC. If there are M digits to the right of the decimal point, the fractional part is worth $10^{-M}$ of an EC.

Figure 3:
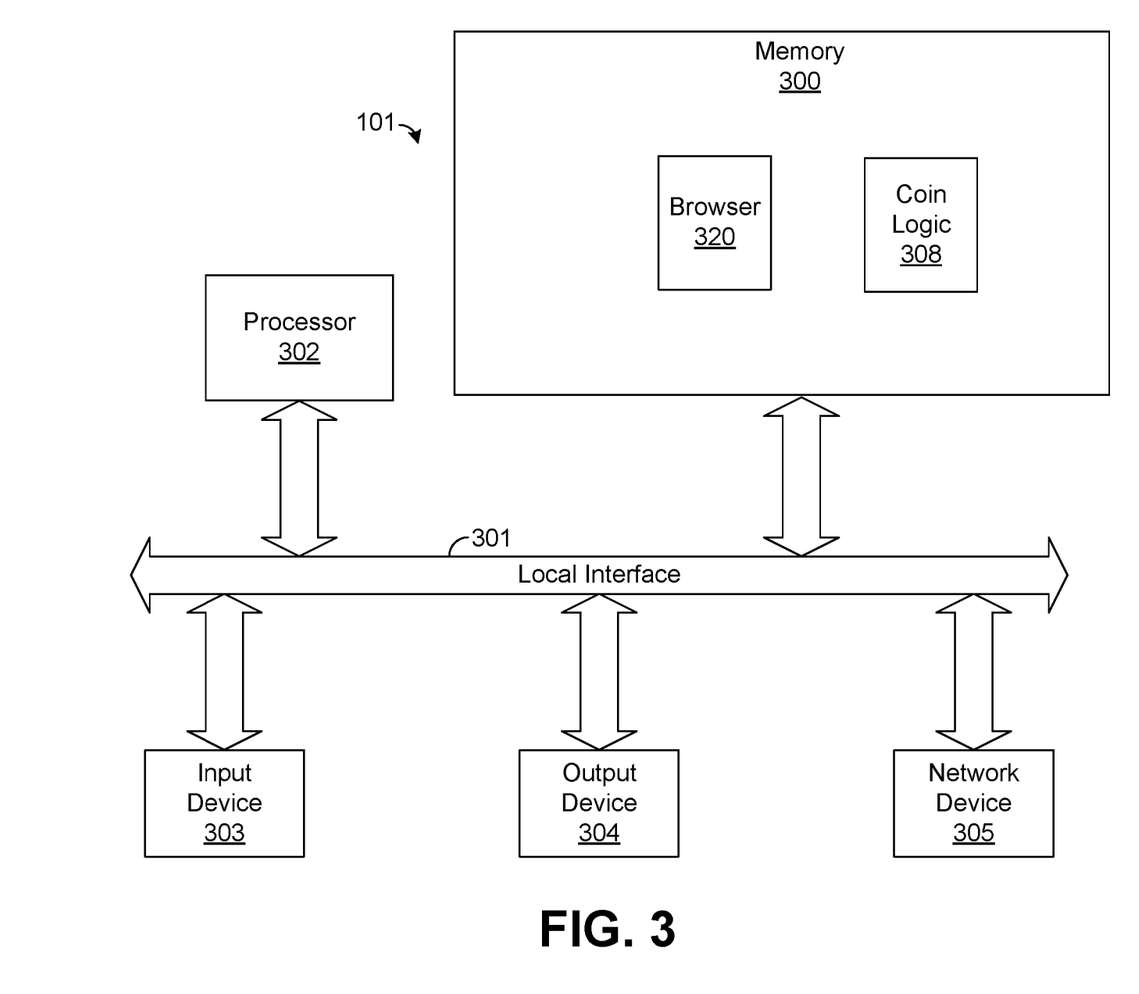
FIG. 3 is a block diagram of a creator computing device of FIG. 1.

FIG. 3 is a block diagram of an exemplary creator computing device 101 as depicted in FIG. 1. Only the architecture of one of said creator computing devices is discussed here for brevity. Each of the other creator computing devices 102-104 has substantially identical hardware and software as the creator computing device 101.

The exemplary creator computing device 101 comprises a processor 302, an output device 304, an input device 303, a network device 305 and memory 300. Each of these components communicates over local interface 301, which can include one or more buses.

The creator computing device 101 further comprises coin logic 308 and browser logic 320. Note that the coin logic 308 and the browser logic 320 can be software, hardware, or a combination thereof. In the exemplary creator computing device 101 shown in FIG. 3, coin logic 308 is software stored in memory 300. Memory 300 may be of any type of memory known in the art, including, but not limited to random access memory (RAM), read-only memory (ROM), flash memory (for the purpose of mass storage), or the like.

The coin logic 308 is shown in FIG. 3 as stored in memory 300. When stored in memory 300, coin logic 308 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a non-transitory computer-readable medium can be any means that can contain, store, communicate, propagate, or transport the program for use by or in connection with the instruction execution system, apparatus, or device. The computer readable medium can be, for example but is not limited to, an electronic, magnetic, optical, electromagnetic, infrared, or semiconductor system, apparatus, device, or propagation medium.

Processor 302 may be a digital processor or other type of circuitry configured to run the coin logic 308 by processing and executing the instructions of the coin logic 308. Further, the processor 302 communicates with and drives the other elements within the creator computing device 101 via the local interface 301.

The network device 305 is any type of device that enables the creator computing device 101 to communicate with the Internet 110 (FIG. 1) and hence with the asset-backed currency computing device 105, the initial transaction computing device 106, the certifier computing device 107, and the block chain verifier computing device(s) 108 over the Internet 110 (FIG. 1). As examples, the network device 305 may enable coupling to a network hub, a network repeater, a network bridge, a network router, a network switch, or the like.

The output device 304 is any type of output device known in the art or future-developed. For example, the output device 304 may include a display device or a speaker device.

The input device 303 is any type of input device known in the art or future-developed. For example, the input device 303 may include a keyboard, a mouse, touchscreen, a speaker, or the like. It is any type of device that allows a user to input data into the creator computing device 105.

Note that each of the system components of system 100 will be described in full after each is introduced hereinafter. This includes the operation of the components as a system.

Figure 4:
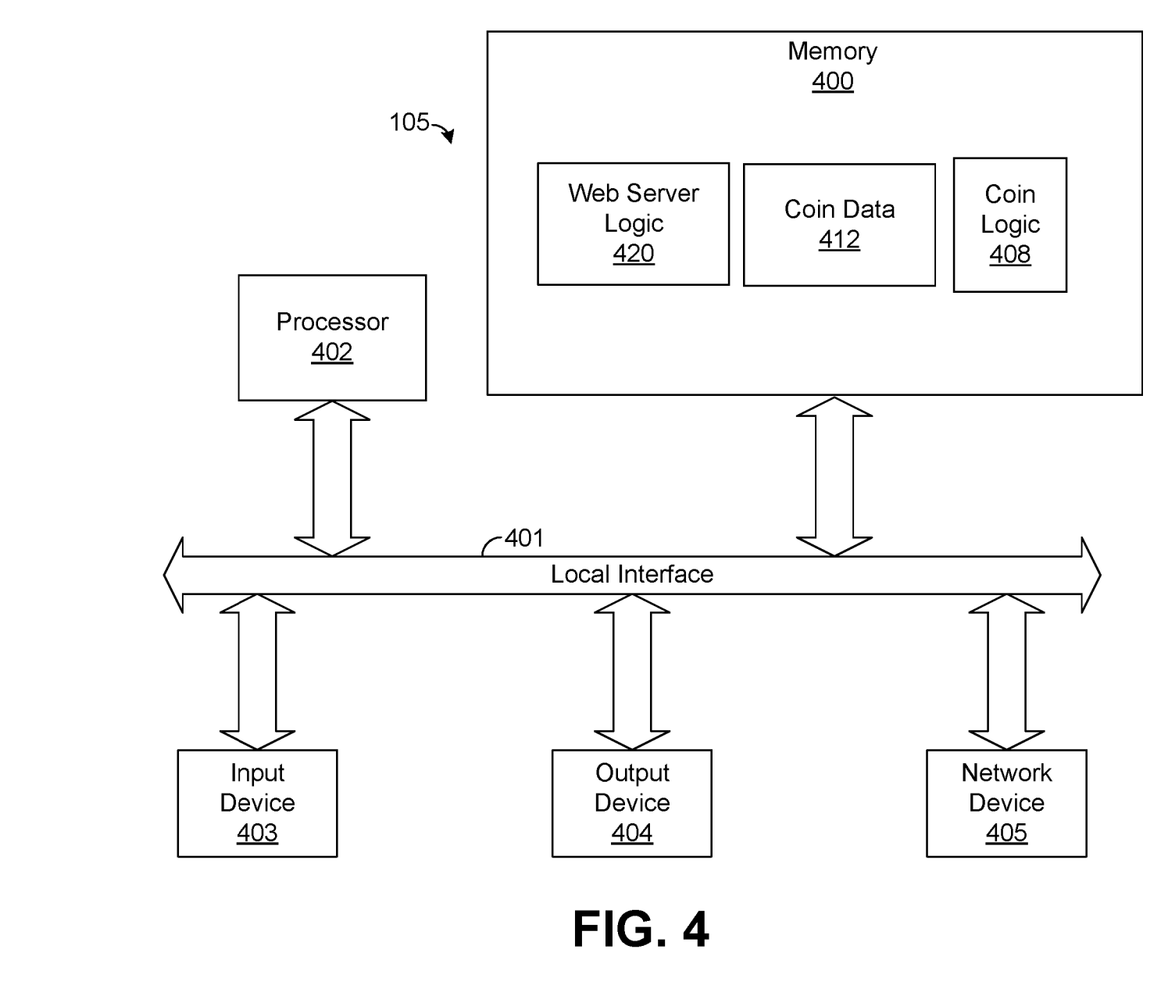
FIG. 4 is a block diagram of an asset-backed currency computing device of FIG. 1.

FIG. 4 is a block diagram of an exemplary asset-backed currency computing device 105 as depicted in FIG. 1. The exemplary asset-backed currency computing device 105 may comprise a processor coin logic 408, an output device 404, an input device 403, a network interface 405 and memory 400. Each of these components communicates over local interface 401, which can include one or more buses.

The asset-backed currency computing device 105 further comprises coin logic 408, a Web server logic 420, and coin data 412. Note that the coin logic 408 and the Web server logic 420 can be software, hardware, or a combination thereof. In the exemplary asset-backed currency computing device 105 shown in FIG. 4, coin logic 408 is software stored in memory 400, and Web server logic 420 is shown stored in memory 400. Memory 400 may be of any type of memory known in the art, including, but not limited to random access memory (RAM), read-only memory (ROM), flash memory (for the purpose of mass storage), or the like.

The coin logic 408 is shown in FIG. 4 as stored in memory 400. When stored in memory 400, coin logic 408 and Web server logic 420 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a non-transitory computer-readable medium can be any means that can contain, store, communicate, propagate, or transport a program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 402 may be a digital processor or other type of circuitry configured to run the coin logic 408 by processing and executing the instructions of the coin logic 408. Further, the processor 402 communicates with and drives the other elements within the asset-backed currency computing device 105 via the local interface 401.

The network device 405 is any type of device that enables communication over the Internet 110 (FIG. 1). As examples, the network device may enable coupling to a network hub, a network repeater, a network bridge, a network router, a network switch, or the like.

The output device 404 is any type of output device known in the art or future-developed. For example, the output device 404 may include a display device or a speaker device.

The input device 403 is any type of input device known in the art or future-developed. For example, the input device 403 may include a keyboard, a mouse, touchscreen, a speaker, or the like. It is any type of device that allows a user to input data into the asset-backed currency computing device 105.

In one embodiment, as mentioned previously, the asset-backed currency device 105 may comprise the Web server 420. The Web server 420 enables communication with potential coin owners through a series of GUIs and the user's Web browser 320 (FIG. 3).

Figure 5:
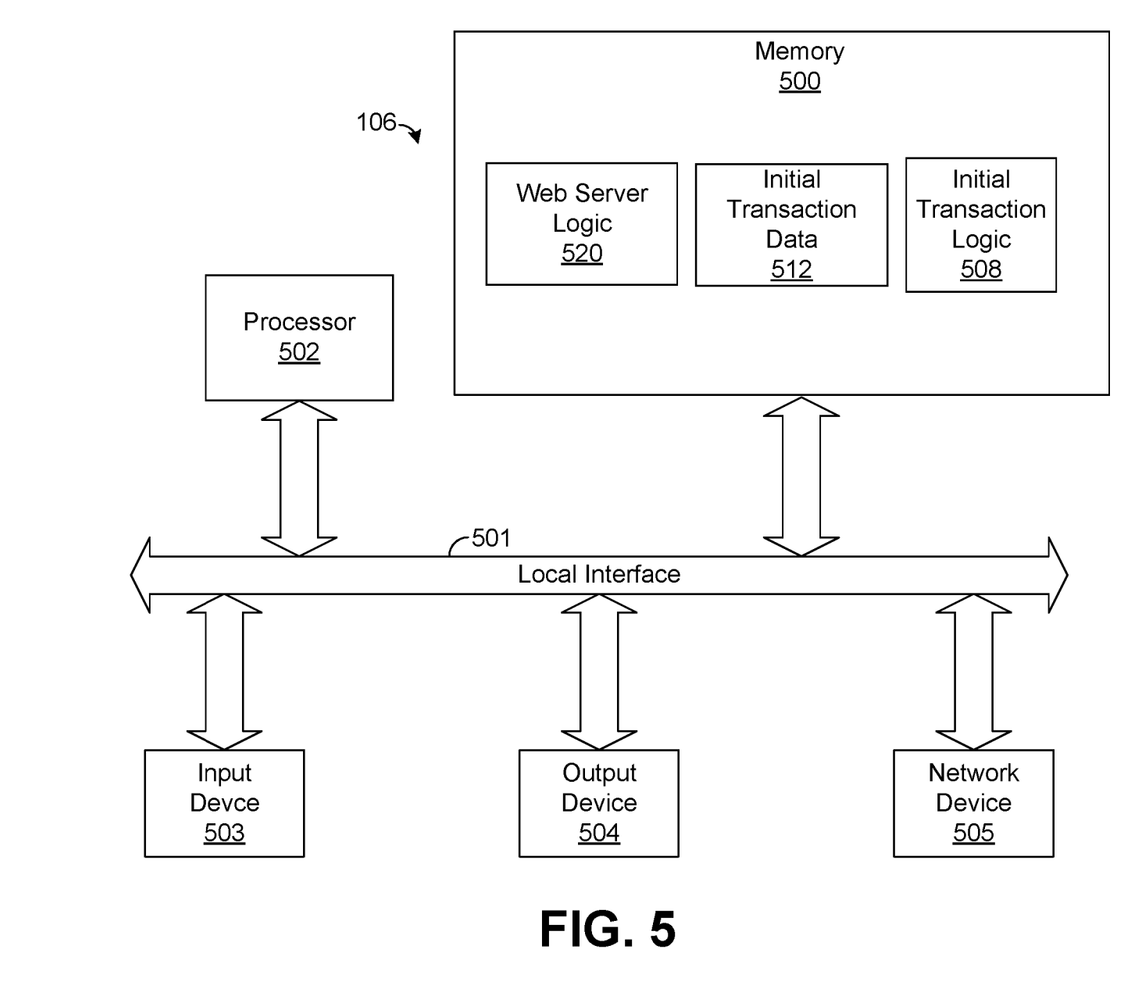
FIG. 5 is a block diagram of an initial transaction computing device of FIG. 1.

FIG. 5 is a block diagram of an exemplary initial transaction computing device 106 as depicted in FIG. 1. The exemplary initial transaction computing device 106 may comprise a processor 502, an output device 504, an input device 503, a network device 505 and memory 500. Each of these components communicates over local interface 501, which can include one or more buses.

The initial transaction computing device 106 further comprises initial transaction logic 508, a Web server logic 520, and initial transaction data 512. Note that the initial transaction logic 508 and the Web server logic 520 can be software, hardware, or a combination thereof. In the exemplary initial transaction computing device 106 shown in FIG. 5, initial transaction logic 508 is software stored in memory 500, and Web server logic 520 is software stored in memory 500. Memory 500 may be of any type of memory known in the art, including, but not limited to random access memory (RAM), read-only memory (ROM), flash memory (for the purpose of mass storage), or the like.

The initial transaction logic 508 and the Web server logic 520 are shown in FIG. 5 as stored in memory 500. When stored in memory 500, initial transaction logic 508 and the Web server logic 520 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a non-transitory computer-readable medium can be any means that can contain, store, communicate, propagate, or transport a program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 502 may be a digital processor or other type of circuitry configured to run the initial transaction logic 508 and the Web server logic 520 by processing and executing the instructions of the initial transaction logic 508 and the Web server logic 520. Further, the processor 502 communicates with and drives the other elements within the initial transaction computing device 106 via the local interface 501.

The network device 505 is any type of device that enables communication over the internet 110 (FIG. 1). As examples, the network device may enable coupling to a network hub, a network repeater, a network bridge, a network router, a network switch, or the like.

The output device 504 is any type of output device known in the art or future-developed. For example, the output device 504 may include a display device or a speaker device.

The input device 503 is any type of input device known in the art or future-developed. For example, the input device 503 may include a keyboard, a mouse, touchscreen, a speaker, or the like. It is any type of device that allows a user to input data into the initial transaction computing device 106.

In one embodiment, as mentioned previously, the initial transaction computing device 106 hosts the Web server logic 520. The Web server logic 520 enables communication with potential coin owners through a series of GUIs and the user's Web browser 320 (FIG. 3).

Figure 6:
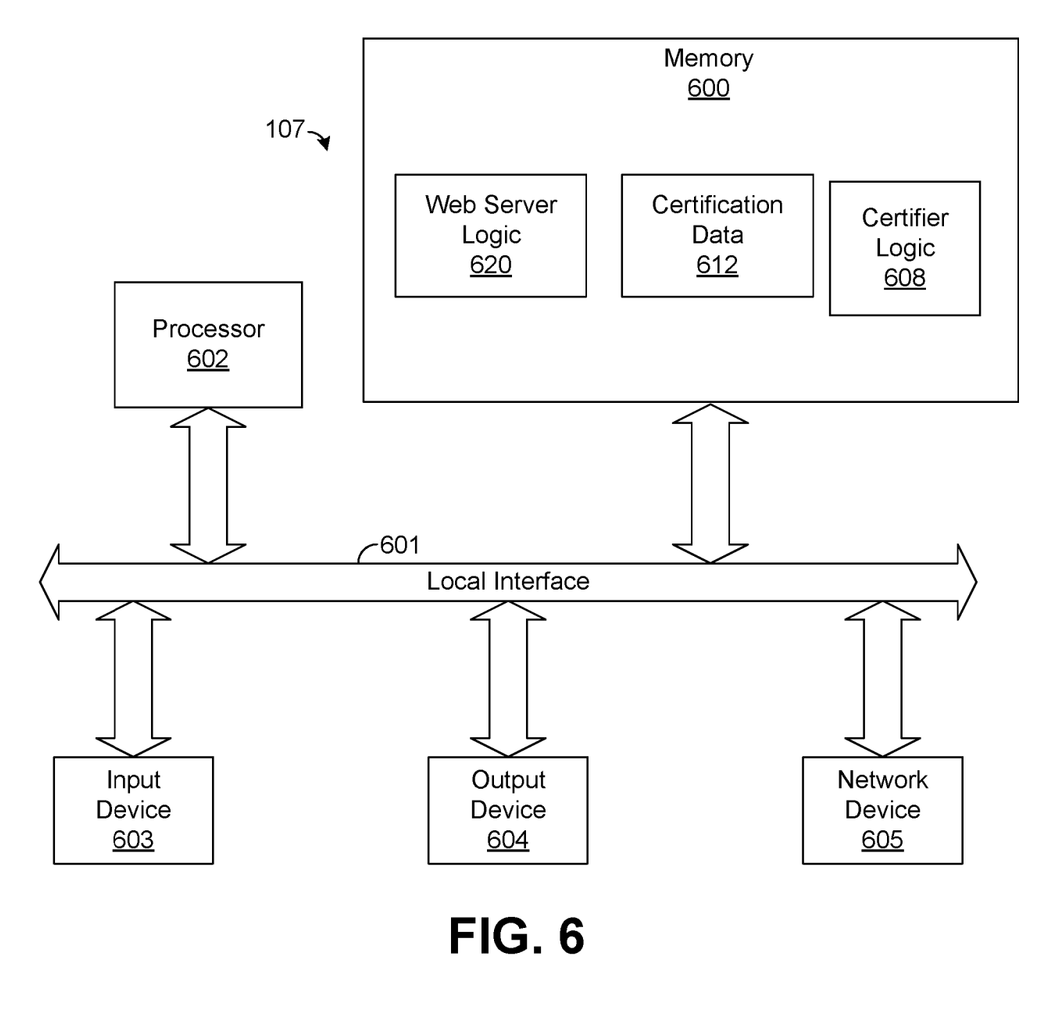
FIG. 6 is a block diagram of a certifier computing device of FIG. 1.

FIG. 6 is a block diagram of an exemplary certifier computing device 107 as depicted in FIG. 1. The exemplary certifier computing device 107 may comprise a processor 602, an output device 604, an input device 603, a network device 605 and memory 600. Each of these components communicates over local interface 601, which can include one or more buses.

The certifier computing device 107 further comprises certifier logic 608, Web serve logic 620, and certification data 612. Note that the certifier logic 608 and the Web server logic 620 can be software, hardware, or a combination thereof. In the exemplary certification computing device shown in FIG. 6, certifier logic 608 is software stored in memory 600, and Web server logic 620 is software shown stored in memory 600. Memory 600 may be of any type of memory known in the art, including, but not limited to random access memory (RAM), read-only memory (ROM), flash memory (for the purpose of mass storage), or the like.

The certifier logic 608 is shown in FIG. 6 as stored in memory 600. When stored in memory 600, certifier logic 608 and Web server logic 620 can be stored and transported on any computer-readable medium for use by or in connection with an instruction execution system, apparatus, or device, such as a computer-based system, processor-containing system, or other system that can fetch the instructions the instruction execution system, apparatus or device and execute the instructions.

In the context of the present disclosure, a non-transitory computer-readable medium can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 602 may be a digital processor or other type of circuitry configured to run the certifier logic 608 and the Web server logic 620 by processing and executing the instructions of the certifier logic 608 and the Web server logic 620. Further, the processor 602 communicates with and drives the other elements within the certification computing device 107 via the local interface 601.

The network device 605 is any type of device that enables communication over the Internet 110 (FIG. 1). As examples, the network device may enable coupling to a network hub, a network repeater, a network bridge, a network router, a network switch, or the like.

The output device 604 is any type of output device known in the art or future-developed. For example, the output device 604 may include a display device or a speaker device.

The input device 603 is any type of input device known in the art or future-developed. For example, the input device 603 may include a keyboard, a mouse, touchscreen, a speaker, or the like. It is any type of device that allows a user to input data into the certification computing device 107.

In one embodiment, the certification computing device 107 hosts the Web server logic 620. The Web server logic 620 enables communication with potential coin owners through a series of GUIs.

Figure 7:
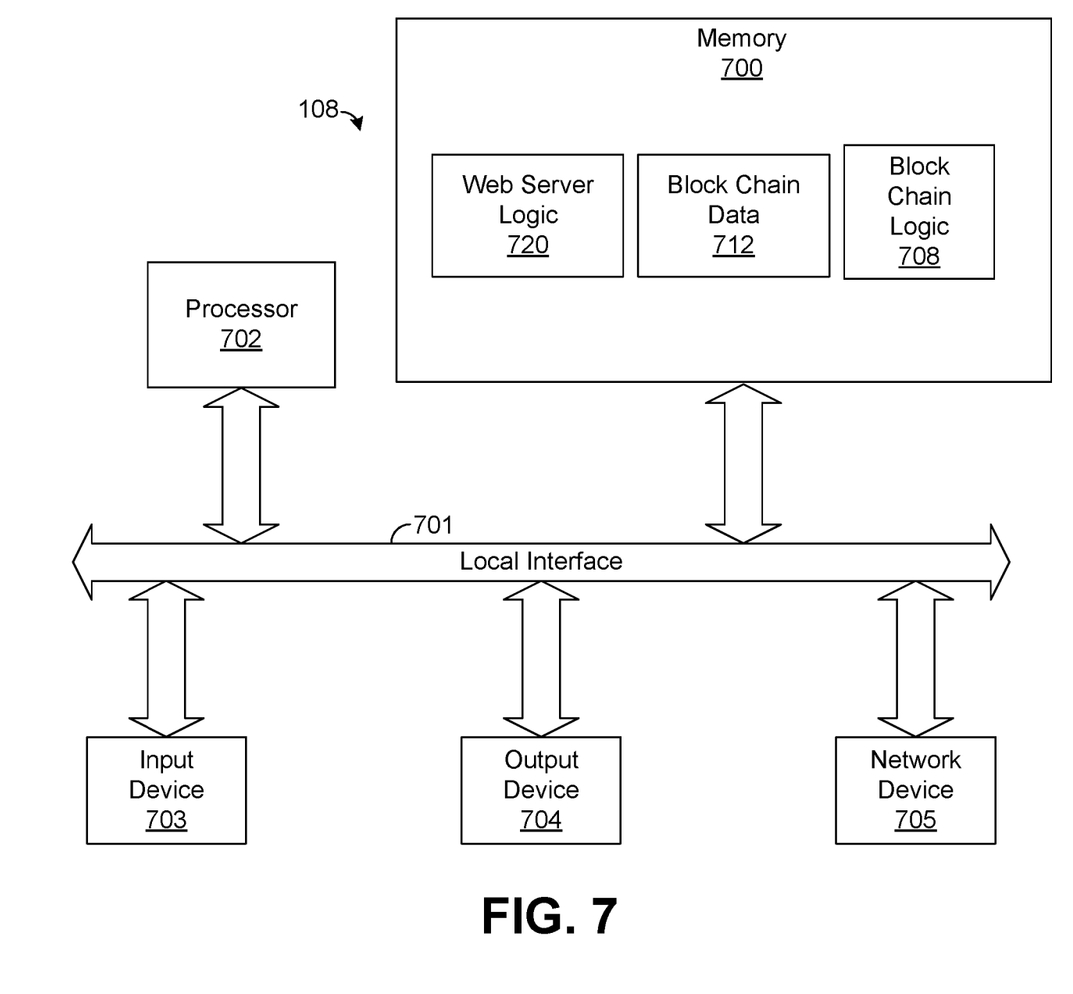
FIG. 7 is a block diagram of a block chain verifier computing device of FIG. 1.

FIG. 7 is a block diagram of an exemplary block chain verifier computing device 108 as depicted in FIG. 1. The exemplary block chain verifier computing device 108 may comprise a processor 702, an output device 704, an input device 703, a network device 705 and memory 700. Each of these components communicates over local interface 701, which can include one or more buses.

The block chain verifier computing device 108 hosts the block chain logic 708. Web server logic 720, and block chain data 712. Note that the block chain logic 708 and the Web server logic 720 can be software, hardware, or a combination thereof. In the exemplary block chain verifier computing device 108 shown in FIG. 7, block chain logic 708 is software stored in memory 700, and Web server logic 720 is software shown stored in memory 700. Memory 700 may be of any type of memory known in the art, including, but not limited to random access memory (RAM), read-only memory (ROM), flash memory (for the purpose of mass storage), or the like.

The block chain logic 708 is shown in FIG. 7 as stored in memory 700. When stored in memory 700, block chain logic 708 and Web server logic 720 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a non-transitory computer-readable medium can be any means that can contain, store, communicate, propagate, or transport a program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 702 may be a digital processor or other type of circuitry configured to run the block chain logic 708 and the Web server logic 720 by processing and executing the instructions of the block chain logic 708 and the Web server logic 720. Further, the processor 702 communicates with and drives the other elements within the block chain verifier computing device 108 via the local interface 701.

The network device 705 is any type of device that enables communication over the Internet 110 (FIG. 1). As examples, the network device may enable coupling to a network hub, a network repeater, a network bridge, a network router, a network switch, or the like.

The output device 704 is any type of output device known in the art or future-developed. For example, the output device 704 may include a display device or a speaker device.

The input device 703 is any type of input device known in the art or future-developed. For example, the input device 703 may include a keyboard, a mouse, touchscreen, a speaker, or the like. It is any type of device that allows a user to input data into the block chain verifier computing device 108.

In one embodiment, the block chain verifier computing device 108 hosts the Web server logic 720. The Web server logic 720 enables the block chain logic 708 to publicly make available the block chain data 712 as blocks are added to the chain, as well as the entire block chain. There will often be multiple block chain verifiers competing to receive a fee awarded to the verifier that is the first to complete the corresponding "pro of work" task.

In operation, a user who desires to create coins navigates using the creator computing device 101-104 to the asset-backed currency computing device 105 (FIG. 4). The user responds to one or more GUIs displayed by the Web Server 420 over the Internet 110 (FIG. 1). Inevitably, the user may have an account and is logged onto the asset-back currency computing device 105. As an example, the user may wish to create 100 coins. Thus, the user enters 100 coins into a GUI displayed by the Web Server logic 420.

In response to the user expressing the desire to create 100 coins, the coin logic 408 stores data in the coin data 412 identifying the user and the number of coins the user wishes to create.

Thereafter, the coin logic 408 transmits a message to the initial transaction computing device 106 comprising data identifying the user, e.g., an internet protocol address (IP address), the amount of coins, and a request to create coins.

In response, the initial transaction logic 508 prompts the user by his IP address and displaying a GUI through its Web server at the creator computing device 101 that requests a creation fee. In this regard, the initial transaction logic 508 requests a creation fee. Architecturally, the initial transaction computing device's main purpose is the levying of the creation fee based upon the number of coins the user has created. The Web server logic 520 displays a GUI to the creator computing device' browser. In response, the coin creator can use varying modes of payment to pay the levied creation fee, e.g., credit card, debit card, electronic check, or the like. Note that the initial transaction computing device 106 is concerned only with the coin creation and not with certification or with any use made of the coin after creation.

Once fees have been paid, the initial transaction logic 508 transmits a message to the block chain verifier computing device 108. In another embodiment, the initial transaction logic 508 can simply make that message data available to the networked block chain verifier computing devices 108. The message may contain the creator's name, the payment, and other information used by the block chain verifier computing device 108 to add a block to the block chain 200 (FIG. 2). Notably, an initial transaction is represented in the chain 200 by a particular block as described hereinabove.

Coin certification is optional. If the coin creator wishes to have the coins certified, then following the creation of the block in the block chain 200, the certifier computing device 107 is provided all information necessary to certify the transaction, i.e., back the transaction with assets owned by the creator (user). There are a number of ways this could occur. First, the certifier, via the certifier computing device 107, could request documents of proof of assets, which the creator provides. Electronic verification may occur to determine initial validity of the documents. In addition, the certifier may manually verify the assets for backing.

In return for certifying a given amount of coin, the certifier contractually constrains assets that the creator has designated as backing for the coins created. Further, the certifier computing device 107 levies a certification fee on the creator. Certified backing is described hereinabove.

As discussed further hereinabove, most of the creation fee levied on the user is transmitted electronically to the block chain verifier computing device 108 that wins the corresponding "proof of work" contest for block chain maintenance.

Figure 8:
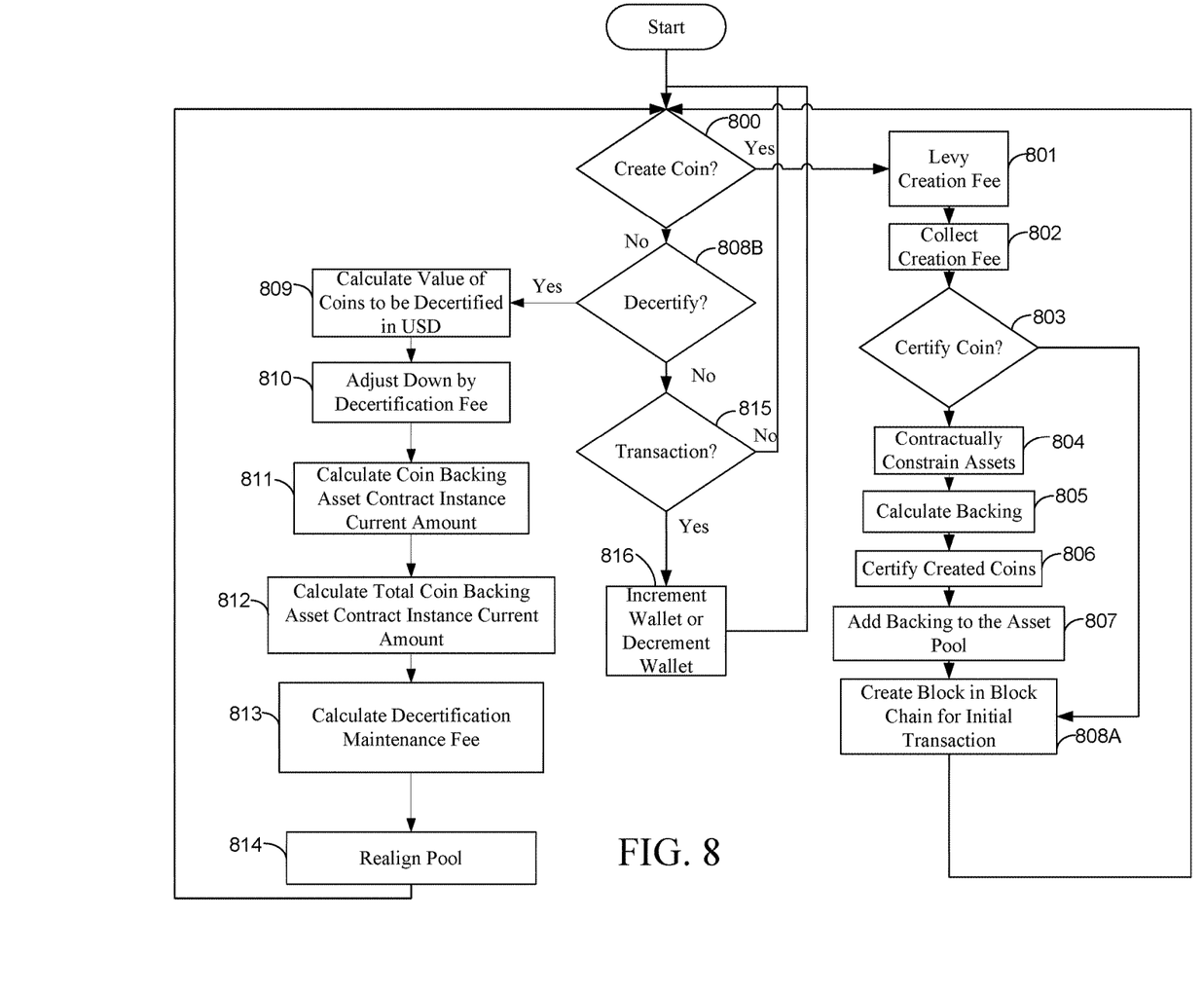
FIG. 8 is a block diagram depicting the exemplary architecture and functionality of the asset-backed currency system disclosed in this document.

FIG. 8 depicts an exemplary architecture and functionality of the asset-backed currency system 100 described hereinabove.

In step 800 the coin logic 308 (FIG. 3) receives a request from a creator (potential owner) of coins. If the creator desires to create coins, the coin logic 308 provides a GUI at the creator computing device 101 in which the creator enters the amount of coin the creator desires.

Based upon the amount of coin the creator desires, the initial transaction logic 508 calculates a creation fee. In step 801, the initial transaction logic 508 levies the creation fee on the creator. In this regard, the coin logic 408 transmits a GUI to the creator computing device 101 requesting payment of the creation fee and modes of payment, e.g. PayPal®, debit card, credit card, or other form of payment. In step 802, the initial transaction logic 508 collects the creation fee. In step 803, the coin creator chooses either to back the coins just created, or to not back those coins at this time. With the former choice, processing continues to step 804. Otherwise processing continues to step 808A for uncertified coins.

The initial transaction logic 508 transmits data to the certification computing device 107 comprising information related to the initial transaction, e.g., the amount of coin the creator desires and identifying information of the creator. The certifier, employing the certification computing device 107, is responsible for contractually constraining the assets in step 804. In this regard, the data transmitted to the certifier computing device 107 may contain data indicative of assets. In another embodiment, the certifier logic 608 (FIG. 6) may transmit a message to the creator via a GUI that requests documents indicative of assets to be used for backing the coins created.

The certifier logic 608 calculates backing in step 805. Note that the certified backing is equal to the product of the asset local currency value, the pledged fraction, the coin fraction value, the coin local currency ratio, and the asset volatility factor.

Based on the calculated backing, the certifier logic 608 certifies the amount of created coins that correspond to the certified backing in step 806. In certifying the coins, the certification logic 608 assigns unique serial numbers to each of the coins created that are backed.

In step 807, the initial transaction logic 508 (FIG. 5) or the certifier logic 608 (FIG. 6) adds the backing calculated to the asset pool, which contains all creation backing (or replacement backing) over every creator who has created coins using the system 100 (FIG. 1). Note that the certified coins are backed by the asset pool. They are not backed by the specific assets contractually pledged by the creator to the certifier to support certification of the coins.

In step 808A, the certifier logic 608 makes data available to the block chain logic 708 so that data can be included in a new block. In step 808A, the block chain logic 708 creates a block 203 (FIG. 2) that includes the initial transaction. This block references the prior block in the block chain 200 (FIG. 2). Note that the block chain 200 is publicly available.

In step 808B, the coin owner may desire to decertify one or more coins contained in his/her wallet. The coin logic 408 of asset backed computing device 105 transmits a message, via a GUI, that the coin owner desires to decertify a particular amount of coin. In response, in step 809, the certifier calculates the value, in USD, of the coins to be decertified. That value is set to the product of C_DV_USD and the number of coins to be decertified. (Here C_DV_USD is the decertification value, in USD, of one coin. That value is set by the certifier).

In step 810 the certifier adjusts the amount, in USD, to be transferred to the coin owner for coin decertification. In this regard, the coin owner pays a decertification fee, and the certifier downwardly adjusts the amount to be transferred to the coin owner by that assessed decertification fee. (A legal person can only decertify coins that are currently owned by that legal person.)

In step 811, the certifier logic 608 calculates the coin backing asset contract instance current amount (C_BA_CI_CA). This is the current amount of coins for which the creator or backing asset holder is obligated to provide backing for a given coin backing asset contract instance. (Here a coin backing asset contract instance (C_BA_CI) is the event where a creator pledges assets owned by the creator as backing for some amount of coin). At the time of certification, the coin backing asset contract instance current amount is set to the value of the coins of the certified backing. However, C_BA_CI_CA is reduced by any coin decertification maintenance fees corresponding to that backing asset contract instance that are paid to the certifier.

In step 812, the certifier logic 608 calculates the TOTAL Coin Backing Asset Contract Instance Current Amount (TOTAL_C_BA_CI_CA). This is defined to be sum of all the Coin Backing Asset Contract Instance Current Amounts (where that sum is taken over all C_BA_CI's where the asset pledge agreement is still applicable.) This quantity is measured in coins.

In step 813, the certifier logic 608 calculates the decertification maintenance fee to be assessed on the creators or (successor) backing asset holders whose assets belong to the asset pool. In step 814, the certifier logic 608 realigns the pool by removing from the asset pool any assets for which the asset portion that is obligated to serve as coin backing is zero. (This happens when the C_BA_CI_CA for that asset is zero.)(Assets can also be removed from the asset pool by payment of a coin backing asset termination fee.)

In step 815, a coin owner may desire to enter into a transaction wallet-to-wallet. In so doing, the asset pool will remain unchanged. In step 816, the creator computing device 101 would increment or decrement the coins in its respective wallet based upon the transaction. The creator computing device and its wallet are used by all coin owners. A coin owner may have created the coins or may have acquired them.

In one embodiment, only certified coins are created. The initial transaction computing device 106 will only make the corresponding data available for coins that have been certified. Coins that are decertified ("cashed out") cease to exist.

A creator computing device may be operated by a legal person who creates coins, by coin backing asset holders, by coin owners, or by legal persons who participate in coin transactions.

An asset backed currency computing device may be used directly or indirectly by a creator computing device, an initial transaction computing device, a certifier computing device, a block chain verifier computing device, a legal person who creates coins, a coin backing asset holder, a coin owner, or by a legal person who participates in coin transactions.

Software employed by an asset backed currency computing device or furnished by an asset backed currency computing device to other legal persons or computing devices may be written and maintained by an organization that supports asset backed currency computing devices.

Software employed by a creator computing device may be furnished by an asset backed currency computing device.

Software employed by an initial transaction computing device may be furnished by an asset backed currency computing device.

Software employed by a certifier computing device may be furnished by an asset backed currency computing device.

Software employed by a block chain verifier computing device may be furnished by an asset backed currency computing device.

Each certifier computing device is made available by and is supported by a certifier organization.

What is claimed is:

1. A cryptocurrency system, comprising
one or more creator computing devices configured to transmit data indicative of an amount of electronic currency, the creator computing devices further configured to communicate via a network, each creator computing device associated with a user and comprising data indicative of a wallet, wherein the wallet comprises data indicative of the user's e-currency and the creator computing device is further configured to track the user's e-currency data as transactions are performed and update the data indicative of the wallet accordingly;

one or more initial transaction computing devices configured for receiving the amount of electronic currency from the creator's computing devices and creating electronic currency based upon the amount of electronic currency requested by the user and for transmitting data indicative of the amount of the electronic currency;

one or more asset-backed computing devices configured for maintaining coin supporting software and offering this software to coin creators, coin owners, coin creator computing devices, initial transaction computing devices, certifier computing devices and block chain verifier computing devices, the asset-backed computing devices are further configured to serve as an interface for other computing devices in the system and are configured for passing or routing data and messages to the other computing devices, and the one or more asset-backed computing devices are configured for receiving the data indicative of the amount of the electronic currency from the initial transaction computing device, the asset-backed computing device are further configured for associating the amount of the electronic currency data indicative of an asset to create asset-backed electronic currency, the asset backed computing device is further configured to transmit data indicative of asset-backed currency to the initial transaction computing device and transmit data indicative of the asset used to create the asset-backed electronic currency, the asset-back computing device is further configured to track transaction associated with the electronic currency of the user;

one or more certifier computing device configured for receiving asset backed electronic currency information from the one or more asset-backed currency computing devices, the certifier computing devices are further configured for contractually constraining the assets identified by the initial transaction computing device thereby certifying the electronic currency; and one or more block chain verifier computing device configured for receiving data indicative of the electronic currency created by the initial transaction computing device and configured for creating a block chain corresponding to the electronic currency of the user.

2. The cryptocurrency system of claim 1, wherein the certifier computing device levies a certification fee against the creators.

3. The cryptocurrency system of claim 1, wherein the certifier computing device assigns a certification identifier the electronic currency and the certification identifier may be a string of numbers or alphanumeric characters.

4. The cryptocurrency system of claim 1, wherein the initial transaction computing device levies a creation fee against the creators.

5. The cryptocurrency system of claim 1, wherein one or more asset backed currency computing devices, transmit data indicative of logic for using the system to the creator computing devices, the initial transaction computing Devices, the certifier computing devices and to legal persons.

6. The cryptocurrency system of claim 1, wherein the one or more asset backed currency computing devices automatically deducts a percentage of the creation fee for managing the asset backed currency computing devices.

7. The cryptocurrency system of claim 1, wherein the one or more certifier computing devices determines the certified backing, which is measured in coin, for a given pledged asset there are five product numbers:

[a] an Asset_LC_Value (ALCV),
[b] a Pledged_Fraction (PL_FRAC),
[c] a C_Fraction (C_FRAC),
[d] a Coin_LC_Ratio (C_LCR) and
[e] an Asset_Volatility_Factor (AVF), wherein the certified backing is equal to the product of these five product numbers.

8. The cryptocurrency system of claim 7, wherein at one of the one or more certifier computing device that determines the asset local currency value (ALCV), and this value is the value of a pledged asset in US Dollars (USD) or other government-issued currency.

9. The cryptocurrency system of claim 8, wherein at least one of the one or more certifier computing device that uses the Pledged_Fraction (PL_FRAC) that is provided by the creator desiring to certify coin(s).

10. The cryptocurrency system of claim 9, wherein at one of the one or more certifier computing devices sets the value of C_Fraction (C_FRAC) and C_FRAC is the fraction of the pledged amount that is acceptable to the certifier to be used as coin backing, and the pledged amount is equal to ALCV X PL_FRAC.

11. The cryptocurrency system of claim 10, wherein at least one of the one or more certifier computing devices sets the value of the coin local currency ratio (C_LCR) in United States Dollars (USD), which is represented by C_per_USD.

12. The cryptocurrency system of claim 11 where at least one of the certifier computing devices sets the value of the Asset Volatility Factor (AVF).

13. The cryptocurrency system of claim 1, wherein the certifier computing device combines pledged assets that back electronic currency into a Backing Asset Pool (BAP).

14. The cryptocurrency system of claim 1, wherein the system enables the owners of certified coins to decertify those coins and upon decertification, the certifier levies a decertification fee against the coin owner decertifying the electronic currency.

15. The cryptocurrency system of claim 14, wherein the certifier computing device automatically determines a decertification fee in United States dollars based on the certified coins undergoing decertification.

16. The cryptocurrency system of claim 5 wherein the certifier computing device automatically levy's a decertification maintenance on the plurality of creators of assets in the coin backing asset pool, and for a given coin backing asset contract instance, the decertification maintenance fee is equal to the total time interval decertification maintenance fee multiplied by the coin backing asset contract instance current amount divided by the sum of all current amounts, wherein the total time interval decertification maintenance fee, for a given time interval, is defined to be the value transferred by the certifier to the owners of electronic currency being decertified in that time interval, and the decertification maintenance fee is levied on each creator or backing asset holder who is still present in the backing asset pool.

17. The cryptocurrency system of claim 1, further comprising a publicly available electronic currency certification/decertification database (CCD_DB) of records.

18. The cryptocurrency system of claim 17, wherein the records in the database include electronic currency certification identifiers, date of certification, coin owners' names and wallet addresses, coin asset backing descriptive data, and decertification data.

19. The cryptocurrency system of claim 18, wherein certification identifiers assigned to electronic currency retain those associations indefinitely, regardless of whether or not the electronic currency is subsequently decertified.

20. The cryptocurrency system of claim 1, wherein the certifier computing device considers replacement of current Coin Backing Assets (CBA) by other assets owned by the creator or backing assets holders, and the certification computing device determines whether or not to approve such replacement.

21. The cryptocurrency system of claim 20, wherein if replacement is approved then the replacement CBA would be subject to the same legal conditions as are assets pledged as backing for newly created coins, and modification of coin backing assets are further recorded and displayed in the database, as well as in the block chain.

22. The cryptocurrency system of claim 21, the certifier computing device may approve the replacement of the owners of coin backing assets by other owners of assets, and in order to effectuate such replacement, the proposed backing asset holders provide coin backing assets and submit to a certification process.

23. The cryptocurrency system of claim 22, wherein the certifier computing device may approve replacement of a deceased creator of coin backing assets by the inheritors of those assets.

24. The cryptocurrency system of claim 1, wherein the one or more block-chain verifier computing devices are configured for recording and accounting for electronic currency creation, certification, decertification and transactions.

25. The cryptocurrency system of claim 24, wherein the one or more Block-Chain Verifier Computing Devices are configured to maintain the blockchain by a public networked means wherein block chain verifier computing devices furnish a proof of work for constructing a block and adding it to the blockchain that public consensus holds as being the current coin blockchain, wherein this processing is supported by a transaction fee levied on those that use electronic currency in transactions.

26. The cryptocurrency system of claim 1, wherein the one or more block-chain verifier computing devices are configured to maintain the blockchain using blocks that contain the following entities or fields:
 [a] Zero or more Full-Coin creation transactions
 [b] Zero or more spending transactions
 [c] Computational proof or work
 [d] Zero or more certification identifiers and supporting information
 [e] Zero or more decertification identifiers and supporting information
 [f] Reference to the chronologically prior Coin block.

27. The cryptocurrency system of claim 1, wherein only certified coins are created and the initial transaction computing device will only create block-chain blocks, or make the corresponding data available, for coins that have been certified, wherein coins that are decertified cease to exist.

* * * * *